No. 713,346. Patented Nov. 11, 1902.
W. H. PRATT.
GROUND DETECTOR.
(Application filed Mar. 19, 1900.)

(No Model.) 2 Sheets—Sheet 1.

Witnesses.
Edw. Williams, Jr.
A. F. Macdonald.

Inventor
William H. Pratt,
by Albert G. Davis
Atty.

No. 713,346. Patented Nov. 11, 1902.
W. H. PRATT.
GROUND DETECTOR.
(Application filed Mar. 19, 1900.)
(No Model.) 2 Sheets—Sheet 2.
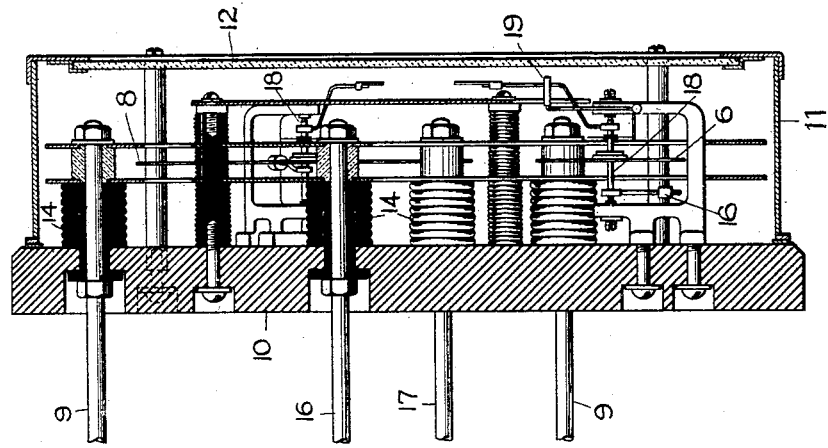
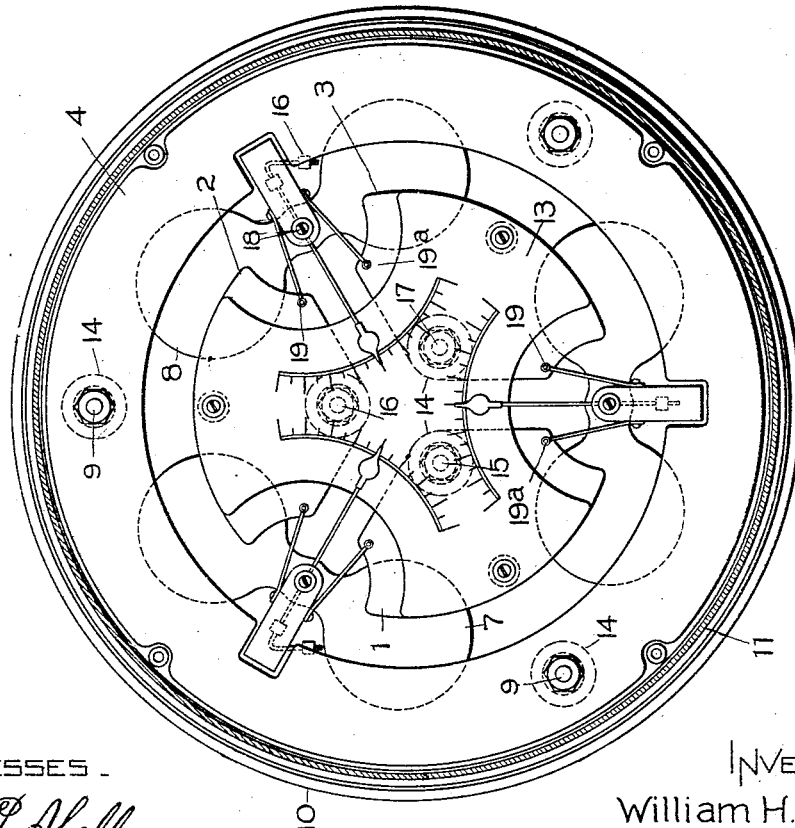
WITNESSES
Lewis E Abell
Benjamin B Hull
INVENTOR
William H. Pratt,
by Albert G. Davis
Atty.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

GROUND-DETECTOR.

SPECIFICATION forming part of Letters Patent No. 713,346, dated November 11, 1902.

Application filed March 19, 1900. Serial No. 9,180. (No model.)

*To all whom it may concern:*

Be it known that I, WILLIAM H. PRATT, a citizen of the United States, residing at Lynn, county of Essex, State of Massachusetts, have invented certain new and useful Improvements in Ground-Detectors, (Case No. 1,031,) of which the following is a specification.

The object of this invention is to provide a ground-detector for polyphase or for multi-wire circuits, the object being to comprise within one instrument means for indicating which wire of a system comprising three or more wires is grounded.

In carrying out my invention I provide a common ground and a plurality of electrostatic surfaces symmetrically located with reference thereto connected with the respective wires of a distribution-circuit the condition of which is to be indicated by the instrument.

In operative relation to the grounded portion of the instrument and to each pair of electrostatic surfaces forming with said grounded portion a plurality of electrostatic fields is an indicator the controlling-vane of which is so mounted as to be acted upon by each of a pair of surfaces in each field. In operative relation to the several pointers is a scale to indicate the particular wire which happens to be grounded.

The novel features will be more fully hereinafter described and will be definitely indicated in the claims appended to this specification.

Figure 1:
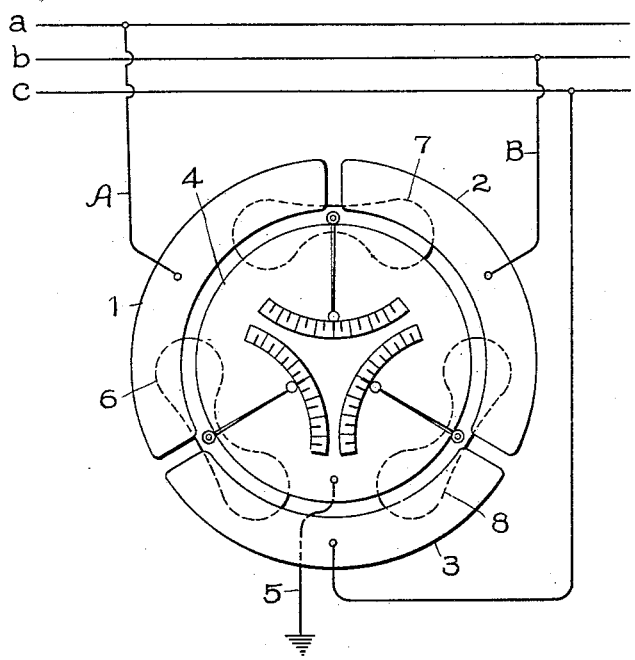
Figure 2:
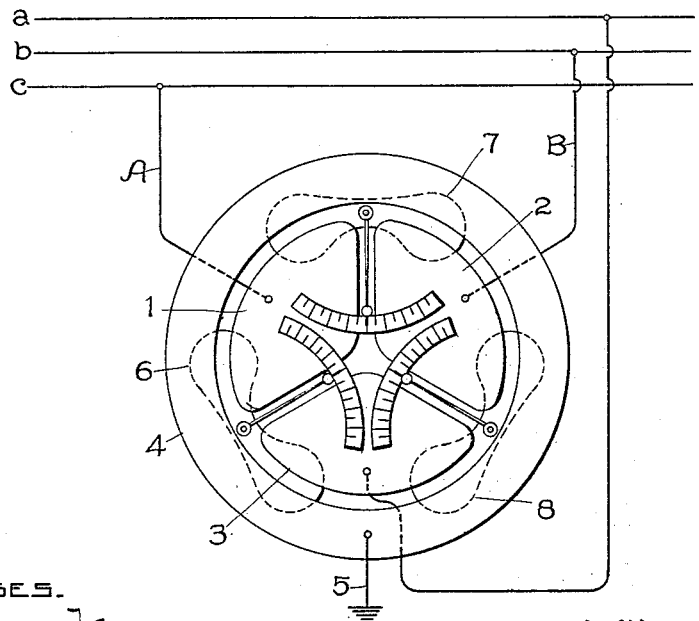

In the accompanying drawings, which illustrate the invention, Figure 1 is a diagram of an instrument embodying my improvements. Fig. 2 is a diagram of a modified form of construction, and Figs. 3 and 4 are a plan and a median cross-section of an instrument constructed on the plan indicated in the diagram in Fig. 2.

Referring first to Fig. 1, *a b c* represent three wires of a distribution system. 1, 2, and 3 represent a range of electrostatic surfaces, commonly called "quadrants," which are arranged in the form of a circle, but insulated from one another and connected, respectively, with the several wires of a distribution system. 4 is a metallic plate connected to ground by a lead or ground wire 5. The plate 4 is symmetrically related with reference to the several segments 1, 2, and 3 and may be mounted over or within the same, as indicated in the diagram. In operative relation to each pair of electrostatic surfaces is mounted a pivoted vane 6 7 8, carrying a needle or indicator mounted to sweep over the scale and indicate by its deflection the electrostatic condition of the two segments by which it is controlled. Thus in the normal condition, when all the segments are charged and there is no ground on the system, the needles will all point toward a determinate point, which may be recognized as the zero-point of the system or a normal proper condition of the apparatus. If, however, a ground occurs on any one wire of the system, the potential of the segment connected with that wire is lowered, thereby reducing the effect of said segment upon the two vanes which are mounted in operative relation to its ends. Thus assuming that the wire A were grounded the vanes 6 and 7 would be shifted and both needles connected with those vanes would indicate a deflection, the two needles being swung to a position more nearly in alinement with one another, and thus indicating that the wire A is grounded. Similarly, if the wire B were grounded the vanes 7 and 8 would be affected. Thus if a ground occurs on the system the particular wire on which it occurs is indicated. Of course by forming a greater number of segments any desired number of distributing-wires may be accommodated.

In Fig. 2 a modification is shown in which the grounded segment is placed on the outside. I consider this a more desirable plan of construction, as it conduces to compactness and simplicity of construction. The ground-plate comprises an annular segment within which are placed three insulated electrostatic surfaces symmetrically related to the annular segment and connected, respectively, with the several wires *a b c* of the system. The several indicators are mounted in a manner similar to the plan indicated in Fig. 1, so as to be within the electrostatic fields set up between the ground-ring and the several segments.

In Figs. 3 and 4 an instrument constructed in accordance with the plan shown in Fig. 2 is shown. The construction will be readily understood from the drawings and will require but little description. The grounded element is indicated at 4 and may be composed of two independent rings placed one over the other, but electrically connected by metal, as indicated in Fig. 4, and connected to a lead 9, passing through a base of insulating material 10. The operative parts of the instrument are covered by a casing 11, glazed on its top, as indicated at 12, through which the condition of the indicators may be noted on a dial-plate 13, supported on insulating-posts. The ground-rings are supported upon three posts symmetrically distributed and well insulated by corrugated rubber pillars 14, the corrugations of which increase the surface. The several electrostatic surfaces 1 2 3 are similarly mounted and connect with leads 15, 16, and 17, passing through the base, with which suitable connection with the line-wires may be made. The electrostatic segments are formed in duplicate in a manner similar to the rings, and the several vanes, as 6, 7, and 8, are journaled on pivots, as 18, and controlled by light adjustable counterweights, being so set with relation to the device as to normally center the index-pointers with relation to the dial, as indicated in Fig. 3. Light spring limiting-stops, as 19 19$^a$, may be provided to prevent excessive vibration of the vanes. By means of the counterweights several needles may be centered at a zero position, notwithstanding a differing potential of the corresponding line-wires with relation to ground.

What I claim as new, and desire to secure by Letters Patent of the United States, is—

1. A ground-detector comprising a plurality of segments related severally to the different wires of a distributing system, a common ground electrostatically related to all of said segments, and a plurality of index-needles, each jointly controlled by a pair of distributing-wires.

2. An electrostatic ground-detector, comprising a plurality of segments, a common ground establishing an electrostatic field with the several segments, connections with the segments for the several wires of a distributing system, and an indicator corresponding to each wire.

3. An electrostatic ground-detector, comprising a plurality of electrostatic segments, a ground-plate symmetrically related thereto, connections for the several segments with the wires of a multiple-wire distributing system, and indicating-vanes in the electrostatic field, each controlled by the joint effect of different pairs of segments.

4. An electrostatic ground-detector, comprising an annular ground-plate, segments inclosed by the same and symmetrically related thereto, and adapted for connection respectively with the several wires of a multiple-wire distributing system, electrostatically-operated vanes under the joint control of successive pairs of segments, and separate indices for the several vanes.

5. A ground-detector for multiple-wire circuits, comprising a plurality of gravity-impelled indicators, means governed by the several wires of the multiple circuit for controlling the several indicators, and an adjustable zero-retractor for each indicator.

6. A ground-detector for multiple-wire circuits, comprising a plurality of indicators, and means coöperating therewith and connected with the respective circuit-wires, whereby the several indicators are controlled by the potential of the wires and the relative angles of the indicators show the grounded wire.

7. A ground-detector for multiple-wire circuits, comprising a plurality of indicators, each indicator being mounted within the joint influence of a different pair of wires, whereby the angle formed by the pointer when deflected indicates the grounded wire, and an adjustable zero-retractor for each indicator.

8. A ground-detector comprising an annular ground-plate, a plurality of electrostatic segments adapted for connection with different circuit-wires forming an electrostatic field with the same, indicators responsive to said fields under the joint influence of adjacent fields, and a centrally-mounted dial for all the indicators.

In witness whereof I have hereunto set my hand this 16th day of March, 1900.

WILLIAM H. PRATT.

Witnesses:
DUGALD McKILLOP,
JOHN McMANUS.